United States Patent
Bretfeld et al.

(10) Patent No.: US 12,001,348 B2
(45) Date of Patent: Jun. 4, 2024

(54) SYSTEM, A SERVER AND A METHOD FOR SECURELY STORING AND PROCESSING RAW DATA FROM A PLURALITY OF DIFFERENT DATA SOURCES

(71) Applicant: Advaneo GmbH, Düsseldorf (DE)

(72) Inventors: Jürgen Bretfeld, Hückehoven (DE); Farshad Firouzi, Düsseldorf (DE)

(73) Assignee: Advaneo GmbH, Düsseldorf (DE)

( * ) Notice: Subject to any disclaimer, the term of this patent is extended or adjusted under 35 U.S.C. 154(b) by 254 days.

(21) Appl. No.: 17/655,864

(22) Filed: Mar. 22, 2022

(65) Prior Publication Data
US 2022/0300435 A1  Sep. 22, 2022

Related U.S. Application Data

(60) Provisional application No. 63/164,010, filed on Mar. 22, 2021.

(51) Int. Cl.
| | | |
|---|---|---|
| *G06F 12/14* | (2006.01) | |
| *H04L 9/14* | (2006.01) | |
| *H04L 9/30* | (2006.01) | |

(52) U.S. Cl.
CPC ............ *G06F 12/1408* (2013.01); *H04L 9/14* (2013.01); *G06F 2212/1052* (2013.01); *H04L 9/30* (2013.01)

(58) Field of Classification Search
CPC .................. G06F 12/1408; G06F 21/60; G06F 2212/1052; H04L 9/14; H04L 9/30
See application file for complete search history.

(56) References Cited

U.S. PATENT DOCUMENTS

| | | | |
|---|---|---|---|
| 10,558,586 B1 * | 2/2020 | Paterra ................ | G06F 12/1408 |
| 11,017,127 B2 * | 5/2021 | Secatch ................ | H04L 9/0891 |
| 2006/0272027 A1 * | 11/2006 | Noble ..................... | H04L 9/32 |
| | | | 711/E12.1 |
| 2007/0116282 A1 * | 5/2007 | Hawkes ............... | H04W 12/033 |
| | | | 380/239 |
| 2007/0186106 A1 * | 8/2007 | Ting .................... | H04L 63/0815 |
| | | | 713/168 |
| 2018/0012032 A1 * | 1/2018 | Radich ..................... | H04L 9/30 |
| 2019/0354697 A1 * | 11/2019 | Aghdam ............... | G06F 21/602 |
| 2020/0145389 A1 * | 5/2020 | Shawe-Taylor ....... | H04L 63/062 |

* cited by examiner

*Primary Examiner* — Shanto Abedin
(74) *Attorney, Agent, or Firm* — Schwegman Lundberg & Woessner, P.A.

(57) ABSTRACT

Described and claimed is a system for securely storing and processing raw data from a plurality of different data sources. The system comprises a server with a processing unit and volatile memory, an external non-volatile memory connected to the server and a plurality of data sources. The server is adapted for encrypting raw data received from each data source of the plurality of data sources and storing the encrypted raw data on the external non-volatile memory, retrieving and decrypting encrypted raw data stored on the at least one external non-volatile memory and processing raw data retrieved from the at least one external non-volatile memory. Further, a corresponding server and a method for securely storing and processing raw data from a plurality of different data sources are described and claimed.

15 Claims, 2 Drawing Sheets

SYSTEM, A SERVER AND A METHOD FOR SECURELY STORING AND PROCESSING RAW DATA FROM A PLURALITY OF DIFFERENT DATA SOURCES

CROSS REFERENCE TO RELATED APPLICATION

This application claims the benefit of provisional U.S. patent application Ser. No. 63/164,010, filed on Mar. 22, 2021, which is hereby incorporated by reference herein in its entirety.

FIELD OF THE INVENTION

The present invention is directed to a system, a server and a method for securely storing and processing raw data from a plurality of different data sources.

BACKGROUND

With the increase in the availability of large amounts of data in all kinds of areas, there has also been an increasing interest in aggregating, combining and analyzing the data, for example, to monetize the data or create new data services and business models. However, aggregating, combining and analyzing data is often complicated as the original raw data is created and owned by many different data owners, each of which can be considered an independent data source. Many data owners are aware of the technical and economic potential that analyzing their data, in particular, in combination with data obtained from other data owners represents. However, they are also cautious since when exchanging their data with third parties, they may not only reveal their business secrets but in addition lose control over their data and for what it is used. In the end third parties unknown to the original data owner might benefit from their data without their knowledge.

For example, in a manufacturing environment nearly every machine is today equipped with connected sensors and control units that are able to monitor and report on the status of the machine. The status of the machine represents raw data will be owned by one data owner or data source but could be used to the benefit of many. For example, the actual user of the machine could use the data to optimize the operation and maintenance of the machine. Analyzing the combined data from many machines of the same type could, for example, be used to optimize settings of the machine to reduce wear and tear, improve the product or enable services around the product such as predictive maintenance.

In order to facilitate the combined analysis of large amounts of data, a secure way of exchanging and analyzing raw data from many different data sources is required which on the one hand enables the use of data by many but on the other hand ensures that the data owner or data source of the raw data maintains control of the location and use of the data. Hence, it is an object of the present invention to provide a system, a server and a method for securely storing and processing raw data from a plurality of data sources.

BRIEF DESCRIPTION OF THE DRAWINGS

In the following exemplary embodiments of a system, a server and a method for securely storing and processing raw data from a plurality of different data sources will be described with reference to the drawings, wherein.

DETAILED DESCRIPTION

Figure 1:
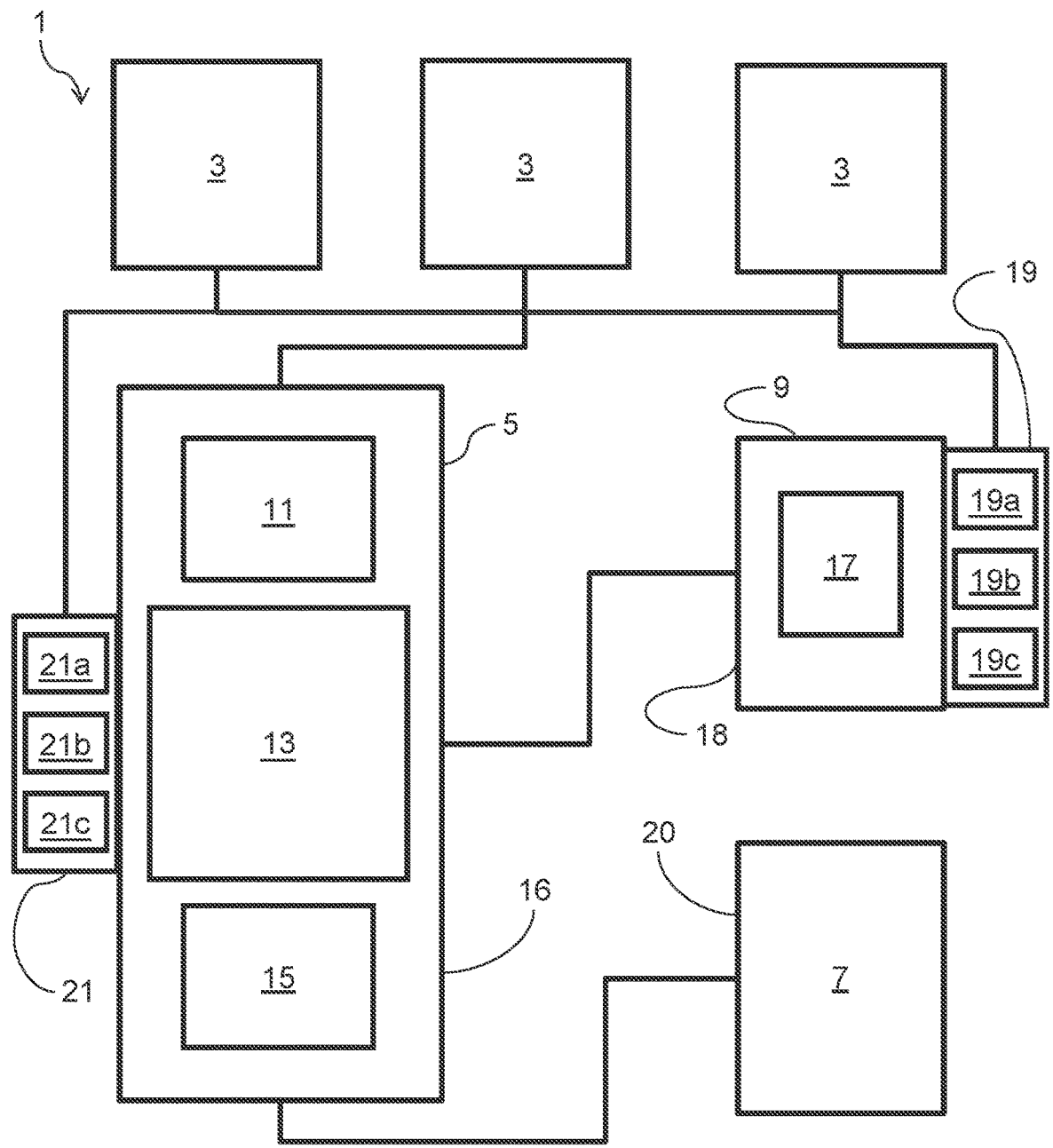
FIG. 1 shows a schematic drawing of an exemplary embodiment of a system for securely storing and processing raw data from a plurality of data sources including an exemplary embodiment of a server for securely storing and processing raw data from a plurality of data sources and FIG. 2 shows a flow chart depicting the steps of an exemplary embodiment of a method for securely storing and processing raw data from a plurality of data sources.

The problem underlying the present invention is solved by a system, a server and a method according to the provided claims. Preferred embodiments of the system according to the present invention are provided in the dependent claims.

In a first aspect the problem is solved by a system for securely storing and processing raw data from a plurality of different data sources. The system comprises a server with a processing unit and volatile memory but preferably no writable non-volatile memory, at least one external non-volatile memory which is connected to the server, and a plurality of data sources each connected to the server. Each of the plurality of data sources is adapted to generate and store a unique participant key, transmit raw data as a transmitting data source for secure storage and processing to the server, wherein the previously generated unique participant key is transmitted with the raw data to the server, and transmit the previously generated unique participant key to the server for processing of raw data stored in the external non-volatile memory. The server is adapted for encrypting raw data received from each transmitting data source of the plurality of data sources and storing the encrypted raw data on the external non-volatile memory, retrieving and decrypting encrypted raw data stored on the at least one external non-volatile memory and processing raw data retrieved from the at least one external non-volatile memory. For encrypting raw data received from a transmitting data source of the plurality of data sources and storing the encrypted raw data on the at least one external non-volatile memory the server is adapted to store the raw data and the participant key received from the transmitting data source in the volatile memory, generate a unique data encryption key for the transmitting data source, encrypt the stored raw data using the generated unique data encryption key for the transmitting data source to obtain encrypted raw data and preferably discarding the unencrypted raw data from the volatile memory of the server after it has been encrypted, encrypt the unique data encryption key for the transmitting data source using the participant key of the transmitting data source to obtain an encrypted data encryption key and preferably discarding the data encryption key and the participant key after the data encryption key has been encrypted, and transmit the encrypted data from the server to the at least one external non-volatile memory for permanent storage.

In other words, the system according to the present invention at least comprises the following elements: a server, at least one external non-volatile memory and a plurality of data sources. The external memory and the plurality of data sources are connected to the server, but in a preferred embodiment there is no direct connection from the data sources to the external memory.

The server comprises a processing unit and volatile memory, i.e., memory that is not persistent and loses its content when not supplied with power. This stands in contrast to non-volatile or persistent memory which maintains its contents, i.e., the information stored in the memory, also when the memory is not supplied with power.

The volatile memory the only memory that the server's processing unit uses on the server to store information during regular operation, i.e., when not operating in a dedicated maintenance mode. In particular, no raw data received from data source or any kind of keys used for encryption may be stored by the server in any non-volatile memory as such, there is no permanent storage of any data in the server that could store data received, generated or obtained in any other way.

It should be noted that the server may also comprise non-volatile memory, for example, for storing the operating system and basic settings of the server. However, such non-volatile memory would be treated as read-only memory by the server during regular operation to which the server has no write access but only read access.

Further, the term processing unit encompasses all kinds of integrated circuits that are used to implement the functions of the server disclosed herein. It is, in particular, not restricted to a single entity but could, for example, be formed by a plurality of processors.

Connected to the server is at least one external non-volatile memory. Preferably, at least two external non-volatile memories are connected to the server to provide redundancy. The connection through which data is transmitted between the server and the external non-volatile memory may be encrypted using transport layer security (TLS). The non-volatile memory is external relative to the server in that it is not part of the server but located remote from the server. It may, for example, be arranged in a different housing than the server or be even located in a different place within the same premises or even on different premises.

Each of the data sources represents an owner of raw data which intends to exchange its raw data while keeping control over its use and distribution. Note that the term data source refers to the entity that owns the raw data and intends to transmit it to the server. The data source, therefore, does not necessarily have to generate the raw data or be the immediate collector of raw data generated, for example, by a plurality of connected sensors. It is merely the source and owner of the raw data from the perspective of the server.

For controlling the use and distribution of its raw data, each data source is adapted to generate its unique participant key which identifies the data source and is used to ensure that a data source maintains control over its raw data exchanged with the server at any time. The data sources are further configured to transmit raw data to the server. With the raw data the participant key is transmitted to the server to facilitate secure storage of the raw data. The participant key can also be transmitted by a data source separate from the server in order to enable processing of previously transmitted raw data as will be described in more detail in the following. Note that each data source will once generate a participant key and reuse the participant key whenever new raw data is transmitted to the server.

The server is configured to perform various tasks. Not only does it have to be able to receive data from each of the data sources, encrypt the received data and store the encrypted raw data on the external non-volatile memory, it also has to be able to retrieve encrypted raw data from the external non-volatile memory, decrypt the raw data and process it to obtain results.

For receiving, encrypting and storing raw data on the external memory, the server is in the first place adapted to receive raw data from a data source together with the unique participant key of that data source. Both the received raw data and the unique participant key are stored by the server only in the volatile memory of the server. Hence, in case the server loses its power supply, for example, because it is moved from one location to another or because the power was cut when detecting an unauthorized access attempt, any information stored in the volatile memory including the raw data and the unique participant key are immediately discarded from the memory and also cannot be accessed again when power is restored at a later time.

The server is further adapted to generate a unique data encryption key for the transmitting data source. The data encryption key is unique in that it is not used for encrypting raw data from any other data source. It may in exemplary embodiments of the system also be unique in that only one data encryption key is generated for each data source, for example, when a data source transmits raw data for the first time to the server. This has the advantage that only one data encryption key has to be handled for each data source. However, in other exemplary embodiments the server may be adapted to generate a new data encryption key for a data source every time the data source transmits new raw data to the server. In such an embodiment, multiple unique data encryption keys would be stored for a data source. This would advantageously allow the data source to tightly control which of its different chunks of raw data can at any time be decrypted by the server.

Using the unique data encryption key for the respective data source, the server encrypts the received raw data and transmits the encrypted raw data to the external non-volatile memory. Once the raw data has been encrypted, the originally received raw data may be discarded by the server from the memory to ensure that the raw data is in the first place not used for any other purpose than securely storing it on the external non-volatile memory.

Additionally, the server encrypts the unique data encryption key used to encrypt the raw data with the participant key of the data source to obtain an encrypted data encryption key. Afterwards, the unencrypted data encryption key as well as the participant key of the data source are preferably immediately discarded or removed from the volatile memory of the server whereby it is ensured that the encrypted raw data cannot be encrypted and further processed without first obtaining the participant key from the respective data source. Thereby, it is ensured that the data source maintains control of its raw data stored on the external non-volatile memory as the encrypted raw data can only be decrypted using the participant key of the data source which remains, however, under control of the data source.

In a preferred embodiment, for retrieving and decrypting encrypted raw data stored on the external non-volatile memory previously received from a transmitting data source of the plurality of data sources, the server is adapted to receive the participant key from the transmitting data source and store the received participant key in the volatile memory of the server, decrypt the encrypted data encryption key for the transmitting data source using the participant key to obtain the data encryption key and store the data encryption key in the volatile memory of the server, wherein the participant key is preferably discarded from the volatile memory after the encrypted data encryption key has been decrypted, decrypt the encrypted raw data to obtain the raw data using the data encryption key after receiving the encrypted raw data from the at least one external non-volatile memory and store the raw data in the volatile memory of the server, wherein the data encryption key is preferably discarded from the non-volatile memory after the encrypted raw data has been decrypted. For processing raw data retrieved from the at least one external non-volatile memory the server is adapted to process the raw data obtained by decrypting encrypted raw data to obtain results, wherein the raw data is preferably discarded from the non-volatile memory after processing of the raw data has been completed.

In other words, the server may also retrieve and decrypt encrypted raw data stored on the external non-volatile memory by reversing the steps previously performed for encrypting and storing the raw data. Hence, in order to be able to decrypt the encrypted raw data, the server has to be able to receive the participant key from a transmitting data source and store the received participant key in the volatile memory of the server. The participant key is then used for decrypting the encrypted data encryption key which was previously used to encrypt the raw data currently stored on the external non-volatile memory. The encrypted data encryption key is eventually used to decrypt the encrypted raw data which was retrieved from the external data source such that the raw data can afterwards be processed further by the server.

Advantageously, the data source of the encrypted raw data, i.e., the data owner, is in control of the raw data stored in the external non-volatile memory as the stored raw data can only be decrypted when the data source provides its participant key.

It should be noted that the server may comprise multiple units which can also be arranged in different housings and different locations that implement different functions of the server. For example, one unit of the server may be used for encrypting the raw data and storing the encrypted raw data on the external non-volatile memory and another unit may be used to retrieve, decrypt and process raw data stored on the external non-volatile memory.

In a preferred embodiment the server is further adapted to combine raw data from two or more of the plurality of data sources obtained by retrieving and decrypting encrypted raw data from the two or more of the plurality of data sources stored in the at least one external non-volatile memory before processing the combined raw data. The server is preferably further adapted to transmit the results obtained by processing the combined raw data to the two or more of the plurality of data sources but preferably not the combined raw data. Hence, in the preferred embodiment processing of combined raw data from different data sources is enabled by the server where different data sources have access to the result of the processing but not the actual raw data. Thereby, each data source maintains the control over its raw data and ensures that no processing is performed on the raw data outside the processing on the server which it agreed to by providing its participant key to the server.

In a preferred embodiment the system comprises a keychain server. The server is adapted for transmitting the encrypted data encryption key obtained by encrypting the unique data encryption key for a transmitting data source using the participant key of the respective transmitting data source to the keychain server. The keychain server is adapted for storing encrypted data encryption keys received from the server in a non-volatile memory and transmitting stored encrypted data encryption keys back to the server. The keychain server advantageously provides a secure storage of the data encryption keys remote from the external non-volatile memory to further increase the hurdles of unauthorized access to the raw data stored therein.

The keychain server is preferably adapted to discard all content stored therein when the keychain server is informed that an unauthorized access to the keychain server is attempted. By discarding the content of the keychain server access to the raw data is prevented at the cost of potentially losing access to the raw data on the external memory permanently unless there is a redundant copy of the keychain server. However, this can be a preferred over allowing unauthorized access to the stored raw data as the latter can likely be retrieved once more from the data sources.

In another preferred embodiment the server is adapted to discard all content of the volatile memory when the server is informed that an unauthorized access to the server is attempted. Since raw data, participant and data encryption keys as well as processing results are only ever stored in non-volatile memory at the server, they can be immediately discarded by removing power from the memory when the server receives any information about an attempted unauthorized access. This further increases the security of the raw data and keys as even if an authorized access is attempted, the content of the memory can be destroyed before any meaningful amounts of data can be removed from the system.

Preferably, the system comprises at least one sensor adapted for detecting unauthorized physical access to the server and/or the keychain server and informing the respective one of the server and the keychain server that an unauthorized access is attempted when an unauthorized physical access is detected. In other words, the sensor is preferably a so-called smart sensor which can by itself inform the server and/or the keychain server such that no intermediate unit is required before the server and/or the keychain server can respond to the attempted unauthorized access.

In a preferred embodiment each sensor of the at least one sensor comprises a processing unit, a communication unit and a memory. The processing unit of each sensor is adapted to transmit a message to each of the plurality of data sources via the communication unit when the respective sensor detects an unauthorized physical access. Each sensor of the at least one sensor is preferably assigned a private/public key pair, wherein the private key of a private/public key pair of a sensor is stored in the memory of the respective sensor, wherein the public key of the sensor is transmitted to each of the data sources and wherein the processing unit of each sensor is adapted to sign the message with its private key. Hence, the recipients of the message, i.e., the data sources, can verify that the message was send by the sensor using the public key of the sensor. The public key can also be used to verify that the message has not been modified after it has been created by the sensor.

The at least one sensor may include, for example, at least one of a power sensor and/or an electromagnetic door lock.

In a preferred embodiment the system comprises a security module adapted for detecting unauthorized digital access to the server and informing the server that an unauthorized access to the server is attempted when an unauthorized digital access is detected. While the sensors ensure that no unauthorized physical access is made to the server, the security module is in particular provided to ensure that no unauthorized digital access is made to the server. To this end, the security module may, for example, be a self-learning system that analyzes all ingoing and outgoing data traffic to determine if any unexpected events occur. Such events may, for example, be an access to keys stored on the server or the transmission of raw data away from the volatile memory of the server to any other entity.

Preferably, the security module is adapted to transmit a message to each of the plurality of data sources when the module detects unauthorized digital access to the server.

In another preferred embodiment the system comprises a server housing in which the server is arranged, wherein the server housing is provided with seals and/or at least partially covered with a coating such that any physical access to the server damages the seal and/or the coating. The coating provides a further way of ensuring that there is no unauthorized physical access to the server.

In a preferred embodiment the server is adapted to transmit a processing message to each of the selected data sources upon receiving a request for processing raw data from a plurality of selected data sources stored in the at least one external non-volatile memory device, wherein the processing message informs the selected data sources that processing of the stored raw data has been requested. Each of the selected data sources is adapted to transmit its participant key to the server when the respective data source consents to the processing of the raw data of the respective data source. The use of processing messages advantageously ensures that each data source is informed about any request of processing its raw data and can make an informed decision whether or not it transmits its participant key in response to the processing message and thereby signal is agreement or disagreement to the processing.

In a preferred embodiment the server is adapted to transmit a maintenance message to each of the plurality of data sources informing the data sources that maintenance of the server is intended. Each of the data sources has a private/public key pair and is adapted to sign a digital agreement with its private key in order to consent to maintenance of the server. The server is preferably adapted to only enable maintenance when all data sources of the plurality of data sources have signed the digital agreement with their respective private key. The signature can be verified using the public key. By using a smart contract requiring the digital signature of every data source it is ensured that any maintenance of the server which potentially enables the change how data is processed can only be performed with the explicit and verifiable consent of all owners of the raw data.

In a second aspect the problem underlying the present invention is solved by a server for securely storing and processing raw data from a plurality of different data sources, the server comprising a processing unit and a volatile memory. The server is configured to be connected to at least one external non-volatile memory and a plurality of data sources, wherein each of the plurality of data sources is adapted to generate and store a unique participant key, transmit raw data as a transmitting data source for secure storage and processing to the server, wherein the previously generated unique participant key is transmitted with the raw data to the server, and transmit the previously generated unique participant key to the server for processing of raw data stored in the external non-volatile memory. The server is further configured for encrypting raw data received from transmitting data sources of a plurality of data sources and storing the encrypted raw data on an external non-volatile memory, retrieving and decrypting encrypted raw data stored on the at least one external non-volatile memory and processing raw data retrieved from the at least one external non-volatile memory. For encrypting raw data received from a transmitting data source of the plurality of data sources and storing the encrypted raw data on the at least one external non-volatile memory the server is adapted to store the raw data and the participant key received from the transmitting data source in the volatile memory, generate a unique data encryption key for the transmitting data source, encrypt the stored raw data using the generated unique data encryption key for the transmitting data source to obtain encrypted raw data, encrypt the unique data encryption key for the transmitting data source using the participant key of the transmitting data source to obtain an encrypted data encryption key, and transmit the encrypted data from the server to the at least one external non-volatile memory for permanent storage.

Preferably, for retrieving and decrypting encrypted raw data stored on the external non-volatile memory previously received from a transmitting data source of the plurality of data sources, the server is adapted to receive the participant key from the transmitting data source and store the received participant key in the volatile memory of the server, decrypt the encrypted data encryption key for the transmitting data source using the participant key to obtain the data encryption key and store the data encryption key in the volatile memory of the server, and decrypt the encrypted raw data to obtain the raw data using the data encryption key after receiving the encrypted raw data from the at least one external non-volatile memory and store the raw data in the volatile memory of the server. For processing raw data retrieved from the at least one external non-volatile memory the server is preferably adapted to process the raw data obtained by decrypting encrypted raw data to obtain results.

The advantages of the server according to the present invention correspond to the advantages of the system according to the present invention that share the respective features of the server. Though not provided in detail here, any embodiment of the server described in the context of an embodiment of a system for securely storing and processing raw data from a plurality of data sources also represents an embodiment of the server itself.

In a third aspect the problem underlying the present invention is solved by a method for securely storing and processing raw data from a plurality of different data sources, the method at least comprising the steps of generating and storing a unique participant key for each of the plurality of data sources, transmitting raw data from a transmitting data source of the plurality of data sources for secure storage and processing to a server, wherein the previously generated unique participant key is transmitted with the raw data to the server, encrypting raw data received from a transmitting data source of the plurality of data sources with a server and storing the encrypted raw data on an external non-volatile memory, retrieving and decrypting encrypted raw data stored on the at least one external non-volatile memory and processing raw data retrieved from the at least one external non-volatile memory. For encrypting raw data received from a transmitting data source of the plurality of data sources and storing the encrypted raw data on the at least one external non-volatile memory the server stores the raw data and the participant key received from the transmitting data source in a volatile memory, generates a unique data encryption key for the transmitting data source, encrypts the stored raw data using the generated unique data encryption key for the transmitting data source to obtain encrypted raw data, encrypts the unique data encryption key for the transmitting data source using the participant key of the transmitting data source to obtain an encrypted data encryption key, and transmits the encrypted data from the server to the at least one external non-volatile memory for permanent storage.

Preferably, for retrieving and decrypting encrypted raw data stored on the external non-volatile memory previously received from a transmitting data source of the plurality of data sources the server receives the participant key from the transmitting data source and stores the received participant key in the volatile memory of the server, decrypts the encrypted data encryption key for the transmitting data source using the participant key to obtain the data encryption key and stores the data encryption key in the volatile memory of the server, and decrypts the encrypted raw data to obtain the raw data using the data encryption key after receiving the encrypted raw data from the at least one external non-volatile memory and stores the raw data in the volatile memory of the server. For processing raw data retrieved from the at least one external non-volatile memory the server preferably processes the raw data obtained by decrypting encrypted raw data to obtain results.

The advantages of the method according to the present invention correspond to the advantages of the system according to the present invention that share the respective features of the method. The method can, in particular, be carried out using one of the embodiments of a system and/or a server described above.

FIG. 1 shows an exemplary embodiment of a system 1 for securely storing and processing raw data from a plurality of data sources 3. In FIG. 1 three data sources 3 are shown which are all connected via a common network such as the internet to a server 5 for securely storing and processing raw data from the plurality of data sources 3. The server 5 is also part of the system 1 and further connected to an external non-volatile memory 7 and a keychain server 9 which are also part of the system 1.

Each of the data sources 3 is the owner of raw data generated, for example, by the sensors and control units of machines used in a manufacturing process (not shown). A data source 3 may, therefore, also be referred to as a data owner. In order to enable processing of the raw data, each of data sources 3 intends to securely store its raw data using the exemplary embodiment of the system 1 without giving up control over its data and giving the party analyzing the data direct access to the raw data. The raw data from the data sources 3 may, for example, be combined to train a machine learning model used for predictive maintenance of the machines which originally generated the data.

To this end, each of the data sources 3 is adapted to carry out various functions. First and foremost, each data source 3 is adapted to generate its own unique participant key which allows the data source 3 to participate in the system 1. The participant key may, for example, be generated from a token that is created by the data source 3. Further, the data source 3 is adapted to transmit its raw data to the server 5 where the raw data will be further processed. Alongside the raw data each data source 3 always transmits its participant key to the server 5 to enable encryption of the raw data by the server 5 in a way that only with the explicit consent of the respective data source 3 the raw data can be processed once it has been encrypted. In order to enable processing of its raw data and signal consent to the processing of its encrypted raw data, each data source 3 is further configure to transmit its participant key also independently of the raw data to the server 5. All transmissions between the plurality of data sources 3 and the server 5 are encrypted, for example, using TLS or other encryption protocols.

The server 5 is an in-memory application server executed by a processing unit 11 of the server 5 whose functionality resides entirely in a volatile memory 13. In other words, the server 5 does not comprise any non-volatile memory that can be used to store data processed by the server 5.

The server 5 which may also be referred to as an application server 5 hosts the entire stack of applications from processes used to analyze raw data securely stored in the system 1 to communication services required to upload raw data and new processes for analyzing raw data as well as to publish the results of an analysis. The application server 5 may also be adapted to report on the status of the server 5 to the data sources 3 and include a security module 15 which will be described in more detail at a later stage. As a protective measure, no secure shell (SSH) access is available to the server 5 and also cannot be activated. Further, the server 5 supports secure boot.

The server 5 is further adapted to receive raw data from each of the data sources 5, encrypt the received raw data, store the encrypted raw data in the external non-volatile memory 7, retrieve encrypted raw data from the external non-volatile memory 7, decrypt the retrieved encrypted raw data and process the decrypted raw data.

In order to encrypt received raw data, the server 5 is adapted to first store the raw data in the volatile memory 13. Together with the raw data of a data source 3, the server stores the data source's 3 participant key in the volatile memory 13 which participant key is transmitted alongside the raw data.

In order to encrypt the received raw data, a unique data encryption key is generated by the server 5 for every data source 3 and the used to encrypt the received raw data. Once the raw data has been encrypted, the received unencrypted raw data is removed from the volatile memory 13 of the server 5 and the encrypted raw data is transmitted via a TLS encrypted connection to the external non-volatile memory 7 for permanent storage. Additionally, the unique data encryption key is encrypted using the participant key of the respective data source 3 and transmitted via a TLS encrypted connection to the keychain server 9 where it is permanently stored in a non-volatile memory 17. Once the data encryption key has been encrypted, the unencrypted data encryption key and the participant key of the data source 3 which has provided the raw data in the first place are removed from the volatile memory 13.

Since the unencrypted raw data as well as the participant key and the unencrypted data encryption key are at any time only stored in volatile memory 13, unauthorized access to the raw data can be easily prevented and can, in particular, not be achieved by removing the server 5 from its original premises as any data is lost from the volatile memory 13 as soon as the server 5 loses power. Further, since the data encryption key which is required to decrypt the encrypted raw data stored in the external non-volatile memory is only stored permanently in an encrypted form, the participant key of the data source 3 needs to be obtained from the data source 3 in order to be able to decrypt and process the encrypted raw data. Thereby, each data source 3 maintains control over its data even though the data is stored in the external non-volatile memory 7.

As already indicated in the preceding paragraph, in order to process raw data stored in encrypted from in the external non-volatile memory 7, the server 5 is adapted to obtain the respective participant key from the original data source 3 of the encrypted raw data and retrieve the corresponding encrypted data encryption key from the keychain server 9. To obtain the participant key from one or all of the data sources 3, the server 5 transmits a processing message to each of the data sources 3 setting out how the raw data of the respective data source 3 shall be processed. The data source 3 can consent to the processing by transmitting its participant key to the server 5 or decline the processing by refraining from transmitting its participant key to the server 5.

In case the server 5 receives the participant key of a data source 3, it uses the key to decrypt the corresponding data encryption key which is in turn used to decrypt the encrypted raw data which his retrieved to this end from the external no-volatile memory 7. Once the participant key has been used to decrypt the encrypted data encryption key, it is removed from the volatile memory 13. In the same way, the encrypted data encryption key is immediately discarded from the volatile memory 13 when the raw data has been decrypted to avoid misuse of the keys. Also the raw data is discarded from the volatile memory 13 as soon as processing of the raw data has been completed.

The server 5 may further be adapted to combine the raw data from multiple data sources 3 before processing, for example, to increase the size of the data set for the training of a neural network or another machine learning method.

To improve the safety of the system 1 and the server 5, the server 5 and the keychain server 9 are both adapted to discard all content stored in their respective memories 13, 17 when receiving a message that unauthorized access to the server 5 or the keychain server 9 is attempted. By discarding all content stored in the volatile memory 13 of the server 5, it is ensured that no unauthorized access can be made to any raw data, participant key or data encryption key residing in unencrypted form in the volatile memory 13. Deleting the content of the non-volatile memory 17 of the keychain server 9 prevents any access to the raw data stored in the external non-volatile memory 7 provided that the keychain server 9 is not redundant.

A message reporting an unauthorized physical access may, for example, be send to the keychain server 9 and the server 5 by one of the sensors 19, 21. The sensor 19 is in the exemplary embodiment an electromagnetic door lock and the sensor 21 is a power sensor. Each sensor 19, 21 comprises a processing unit 19a, 21a, a communication unit 19b, 21b and a memory 19c, 21c.

In the memory 19c, 21c a private key of the respective sensor 19, 21 is stored which is used to sign any message send by the respective sensor 19, 21. The corresponding public key is stored at the server 5, the keychain server 9 and the data sources 3 so that each of these entities 3, 5, 9 can verify whether a message allegedly created by one of the sensors 19, 21 has indeed been created by that sensor 19, 21 and whether or not the message has been modified after it was created. Thereby, false messages triggering a deletion of the memory 13, 17 of the server 3 and the keychain server 17 can be prevented and it is also possible to detect when a message actually indicating an unauthorized access has been modified by a third party, for example, to a message simply reporting the status of the respective sensor 19, 21.

As an additional measure to protect unauthorized access to the housings 16, 18, 20 of the server 5, the keychain server 9 and the external non-volatile memory 7 are covered with a coating and provided with seals such that any unauthorized physical access destroys the coating or the seals.

In addition to the sensors 19, 21, a message reporting an unauthorized attempt to access the server 5 may be send by the security module 15 which is adapted to discover unauthorized digital access to the server 5. The digital security module 15 monitors all ingoing and outgoing data to and from the server 5 and notifies the server 5 of an attempt of unauthorized access to the server 5 so that the server 5 can discard all contents of the volatile memory 13 to prevent access to the raw data.

The server 5 is further adapted to transmit to each of the data sources 3 a maintenance message when maintenance of the server 5 is intended. Each of the data sources 3 has to sign a digital agreement in order for the maintenance to go forward. To this end every data source 3 has a private key which is used to sign the digital agreement. Each of the other data sources 3 and the server 5 have the public key of the (other) data sources 3 to be able to verify that all data sources 3 have signed the digital agreement.

All communication between the data sources 3, the server 5 and the sensors 19, 21 is exchanged by publishing messages to blocks of a block chain. The blocks of the block chain are also used for continuous status reporting of the sensors 17, 19, the security module 15 and the server 5 and used to transfer maintenance and processing messages. Since the blocks are stored at each of the data sources 3, each data source 3 is permanently kept informed about the status of the system 1 and it is very difficult to retrospectively modify any status information, for example, to conceal an unauthorized access attempt or unauthorized processing of raw data.

Figure 2:
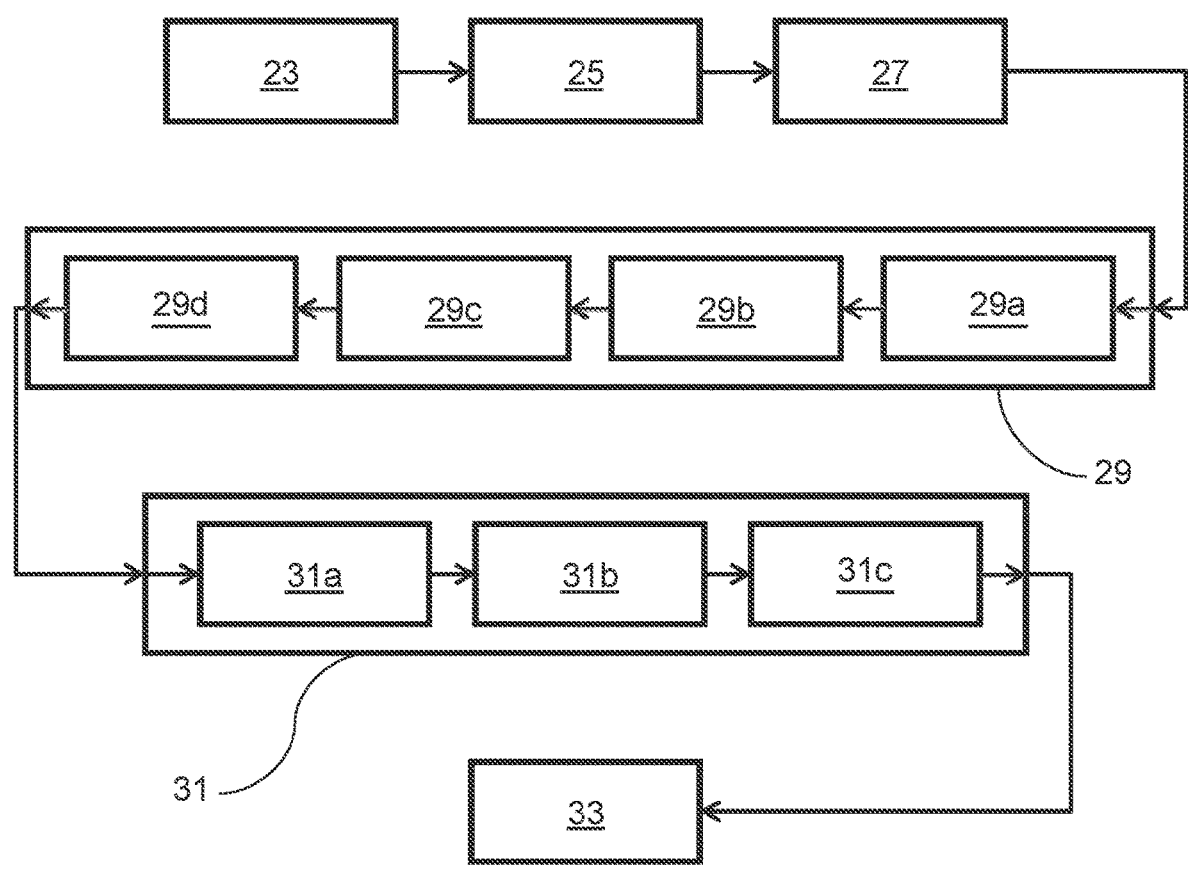

FIG. 2 shows an exemplary embodiment of a method for securely storing and processing raw data with the exemplary embodiment of a system 1 and a server 5 shown in FIG. 1. The steps of the methods will only be briefly described as details of each step have already been described with reference to the system 1 and the server 5.

According to the exemplary embodiment of the method, in a first step 23 a unique participant key for each data source 3 is generated at each of the data sources 3. In a second step 25 the participant key is stored at the respective data source 3. Next, raw data is transmitted together with the participant key to the server 5 in a third step 27. Here, the raw data received from a data source 3 is encrypted and stored at the external non-volatile memory 7 in a fourth step 29.

The fourth step 29 involves four sub-steps 29a to 29d. In the first sub-step 29a the raw data and participant key received from a data source 3 are stored in the volatile memory 13 of the server 3. In the following sub-step 29b the server 5 generates a unique data encryption key for the respective data source 3. Generating a data encryption key may also be achieved by retrieving an existing encrypted data encryption key for this data source 3 from the keychain server 9 and decrypting the encrypted data encryption key with the participant key. In sub-step 29c the raw data is encrypted using the unique data encryption key for the respective data source 3 and transmitted to the remote non-volatile memory 7 for permanent storage. Once encryption of the raw data has been completed, the unencrypted raw data is removed from the volatile memory 13. In the last sub-step 29d the data encryption key is encrypted using the participant key of the data source 3 and transmitted for storage to the keychain server 9 where it is stored in the non-volatile memory 17. Additionally, the unencrypted data encryption key as well as the participant key are removed from the volatile memory 13 as soon as the data encryption key has been encrypted.

In the fifth step 31 encrypted raw data stored in the external non-volatile memory 7 is retrieved and decrypted. The fifth step comprises sub-steps 31a to 31c which involves receiving the participant key from a data source 3 and storing the received participant key in the volatile memory 13 of the server 5 in the first sub-step 31a, decrypting the encrypted data encryption key for the transmitting data source using the participant key to obtain the data encryption key and storing the data encryption key in the volatile memory 13 of the server 5 in the second sub-step 31b, and finally in the last sub-step 31c decrypting the encrypted raw data to obtain the raw data using the data encryption key after receiving the encrypted raw data from the external non-volatile memory 7 and storing the raw data in the volatile memory 13 of the server 5.

The second sub-step 31*b* also includes obtaining the encrypted data encryption key from the keychain server 9 and deleting the participant key from the volatile memory 13 as soon as the data encryption key has been decrypted. In the last sub-step 31*c* the unencrypted data encryption key is removed from the volatile memory 13 as soon as decryption of the previously encrypted raw data has been completed.

Finally, in the sixth step 33 the raw data retrieved from the external non-volatile memory 7 is processed by the server 5. Once processing has been completed, the raw data is immediately discarded from the volatile memory 13. Thus, in the exemplary embodiment of the method the data owner controls at any time who has access to his raw data, the raw data is never actually shared with any other party and never stored in unencrypted form in a permanent memory.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system for securely storing and processing raw data from a plurality of different data sources the system comprising:
    a server with a processing unit and volatile memory;
    at least one external non-volatile memory which is connected to the server; and
    a plurality of data sources each connected to the server, wherein each of the plurality of data sources is adapted to:
        generate and store a unique participant key;
        transmit raw data as a transmitting data source for secure storage and processing to the server, wherein the previously generated unique participant key is transmitted with the raw data to the server; and
        transmit the previously generated unique participant key to the server for processing of raw data stored in the external non-volatile memory,
    wherein the server is adapted for encrypting raw data received from each transmitting data source of the plurality of data sources and storing the encrypted raw data on the external non-volatile memory, retrieving and decrypting encrypted raw data stored on the at least one external non-volatile memory and processing raw data retrieved from the at least one external non-volatile memory,
    wherein for encrypting raw data received from a transmitting data source of the plurality of data sources and storing the encrypted raw data on the at least one external non-volatile memory the server is adapted to:
        store the raw data and the participant key received from the transmitting data source in the volatile memory;
        generate a unique data encryption key for the transmitting data source;
        encrypt the stored raw data using the generated unique data encryption key for the transmitting data source to obtain encrypted raw data, encrypt the unique data encryption key for the transmitting data source using the participant key of the transmitting data source to obtain an encrypted data encryption key; and
        transmit the encrypted data from the server to the at least one external non-volatile memory for permanent storage.

2. The system according to claim 1, wherein for retrieving and decrypting encrypted raw data stored on the external non-volatile memory previously received from a transmitting data source of the plurality of data sources the server is adapted to:
    receive the participant key from the transmitting data source and store the received participant key in the volatile memory of the server;
    decrypt the encrypted data encryption key for the transmitting data source using the participant key to obtain the data encryption key and store the data encryption key in the volatile memory of the server; and
    decrypt the encrypted raw data to obtain the raw data using the data encryption key after receiving the encrypted raw data from the at least one external non-volatile memory and store the raw data in the volatile memory of the server,
    wherein for processing raw data retrieved from the at least one external non-volatile memory the server is adapted to process the raw data obtained by decrypting encrypted raw data to obtain results.

3. The system according to claim 1, wherein the server is further adapted to combine raw data from two or more of the plurality of data sources obtained by retrieving and decrypting encrypted raw data from the two or more of the plurality of data sources stored in the at least one external non-volatile memory before processing the combined raw data.

4. The system according to claim 3, wherein the server is adapted to transmit the results obtained by processing the combined raw data to the two or more of the plurality of data sources.

5. The system according to claim 1, wherein the system comprises a keychain server,
    wherein the server is adapted for transmitting the encrypted data encryption key obtained by encrypting the unique data encryption key for a transmitting data source using the participant key of the transmitting data source to the keychain server, and
    wherein the keychain server is adapted for storing encrypted data encryption keys received from the server in a non-volatile memory and transmitting stored encrypted data encryption keys back to the server.

6. The system according to claim 5, wherein the keychain server is adapted to discard all content stored therein when the keychain server is informed that an unauthorized access to the keychain server is attempted.

7. The system according to claim 1, wherein the server is adapted to discard all content of the volatile memory when the server is informed that an unauthorized access to the server is attempted.

8. The system according to claim 6, wherein the system comprises at least one sensor adapted for detecting unauthorized physical access to the server or the keychain server and informing the respective one of the server and the keychain server that an unauthorized access is attempted when an unauthorized physical access is detected.

9. The system according to claim 8, wherein each sensor of the at least one sensor comprises a processing unit, a communication unit and a memory,
    wherein the processing unit of each sensor is adapted to transmit a message to each of the plurality of data sources via the communication unit when the respective sensor detects an unauthorized physical access,
    wherein each sensor of the at least one sensor is preferably assigned a private/public key pair, wherein the private key of a private/public key pair of a sensor is stored in the memory of the respective sensor, wherein the public key of the sensor is transmitted to each of the data sources and wherein the processing unit of each sensor is adapted to sign the message with its private key.

10. The system according to claim 7, wherein the system comprises a security module adapted for detecting unauthorized digital access to the server and informing the server that an unauthorized access to the server is attempted when an unauthorized digital access is detected,
wherein the security module is preferably adapted to transmit a message to each of the plurality of data sources when the module detects unauthorized digital access to the server.

11. The system according to claim 1, wherein the system comprises a server housing in which the server is arranged, wherein the server housing is provided with seals or at least partially covered with a coating such that any physical access to the server damages the seal or the coating.

12. The system according to claim 1, wherein the server is adapted to transmit a processing message to each of the selected data sources upon receiving a request for processing raw data from a plurality of selected data sources stored in the at least one external non-volatile memory,
wherein the processing message informs the selected data sources that processing of the stored raw data has been requested, and
wherein each of the selected data sources is adapted to transmit its participant key to the server when the respective data source consents to the processing of the raw data of the respective data source.

13. The system according to claim 1, wherein the server is adapted to transmit a maintenance message to each of the plurality of data sources informing the data sources that maintenance of the server is intended, wherein each of the data sources has a private/public key pair and is adapted to sign a digital agreement with its private key in order to consent to maintenance of the server, wherein the server is adapted to only enable maintenance when all data sources of the plurality of data sources have signed the digital agreement with their respective private key.

14. A server for securely storing and processing raw data from a plurality of different data sources, the server comprising a processing unit and a volatile memory,
wherein the server is configured to be connected to at least one external non-volatile memory and a plurality of data sources, wherein each of the plurality of data sources is adapted to generate and store a unique participant key, transmit raw data as a transmitting data source for secure storage and processing to the server, wherein the previously generated unique participant key is transmitted with the raw data to the server, and transmit the previously generated unique participant key to the server for processing of raw data stored in the external non-volatile memory,
wherein the server is further configured for encrypting raw data received from transmitting data sources of a plurality of data sources and storing the encrypted raw data on an external non-volatile memory, retrieving and decrypting encrypted raw data stored on the at least one external non-volatile memory and processing raw data retrieved from the at least one external non-volatile memory,
wherein for encrypting raw data received from a transmitting data source of the plurality of data sources and storing the encrypted raw data on the at least one external non-volatile memory the server is adapted to:
store the raw data and the participant key received from the transmitting data source in the volatile memory;
generate a unique data encryption key for the transmitting data source;
encrypt the stored raw data using the generated unique data encryption key for the transmitting data source to obtain encrypted raw data;
encrypt the unique data encryption key for the transmitting data source using the participant key of the transmitting data source to obtain an encrypted data encryption key; and
transmit the encrypted data from the server to the at least one external non-volatile memory for permanent storage,
wherein for retrieving and decrypting encrypted raw data stored on the external non-volatile memory previously received from a transmitting data source of the plurality of data sources the server is preferably adapted to:
receive the participant key from the transmitting data source and store the received participant key in the volatile memory of the server;
decrypt the encrypted data encryption key for the transmitting data source using the participant key to obtain the data encryption key and store the data encryption key in the volatile memory of the server; and
decrypt the encrypted raw data to obtain the raw data using the data encryption key after receiving the encrypted raw data from the at least one external non-volatile memory and store the raw data in the volatile memory of the server,
wherein for processing raw data retrieved from the at least one external non-volatile memory the server is preferably adapted to process the raw data obtained by decrypting encrypted raw data to obtain results.

15. A method for securely storing and processing raw data from a plurality of different data sources, the method at least comprising the steps of:
generating and storing a unique participant key for each of the plurality of data sources;
transmitting raw data from a transmitting data source of the plurality of data sources for secure storage and processing to a server, wherein the previously generated unique participant key is transmitted with the raw data to the server;
encrypting raw data received from a transmitting data source of the plurality of data sources with a server and storing the encrypted raw data on an external non-volatile memory;
retrieving and decrypting encrypted raw data stored on the at least one external non-volatile memory; and
processing raw data retrieved from the at least one external non-volatile memory,
wherein for encrypting raw data received from a transmitting data source of the plurality of data sources and storing the encrypted raw data on the at least one external non-volatile memory the server:
stores the raw data and the participant key received from the transmitting data source in a volatile memory;
generates a unique data encryption key for the transmitting data source;
encrypts the stored raw data using the generated unique data encryption key for the transmitting data source to obtain encrypted raw data;
encrypts the unique data encryption key for the transmitting data source using the participant key of the transmitting data source to obtain an encrypted data encryption key; and transmits the encrypted data from the server to the at least one external non-volatile memory for permanent storage, wherein for retrieving and decrypting encrypted raw data stored on the external non-volatile memory previously received from a transmitting data source of the plurality of data sources the server:

receives the participant key from the transmitting data source and stores the received participant key in the volatile memory of the server;

decrypts the encrypted data encryption key for the transmitting data source using the participant key to obtain the data encryption key and stores the data encryption key in the volatile memory of the server; and decrypts the encrypted raw data to obtain the raw data using the data encryption key after receiving the encrypted raw data from the at least one external non-volatile memory and stores the raw data in the volatile memory of the server, wherein for processing raw data retrieved from the at least one external non-volatile memory the server preferably processes the raw data obtained by decrypting encrypted raw data to obtain results.

* * * * *